United States Patent
Nilsson

[11] 3,943,351
[45] Mar. 9, 1976

[54] LIGHTING ARRANGEMENT FOR A BODY COMPARTMENT IN THE FRONT PORTION OF A VEHICLE

[75] Inventor: Sten Erling Nilsson, Sjuntorp, Sweden

[73] Assignee: Saab-Scania AB, Sodertalje, Sweden

[22] Filed: July 3, 1974

[21] Appl. No.: 485,704

[30] Foreign Application Priority Data
July 6, 1973 Sweden.............................. 7309545

[52] U.S. Cl............................................. 240/7.1 R
[51] Int. Cl.²......................................... B60Q 3/06
[58] Field of Search............ 240/7.1 R, 41.15, 2.18, 240/8.18, 7.1 H

[56] References Cited
UNITED STATES PATENTS
1,723,863  8/1929  Jeffrey ............................ 240/7.1 R
1,871,877  8/1932  Buckman ......................... 240/7.1 R
2,580,699  1/1952  Pfetzing ............................ 240/2.18
2,900,491  8/1959  Barenyi et al. ............... 240/7.1 R X FOREIGN PATENTS OR APPLICATIONS
214,294  3/1961  Austria............................. 240/7.1 R Primary Examiner—Richard M. Sheer
Assistant Examiner—E. M. O'Connor
Attorney, Agent, or Firm—Cushman, Darby & Cushman

[57] ABSTRACT

A lighting arrangement on a vehicle, using light from a headlight to illuminate a compartment in the front end of the vehicle when a hood normally closing the compartment is in open position. Light is reflected into the compartment via two mirrors mounted on the inside of the hood.

4 Claims, 1 Drawing Figure

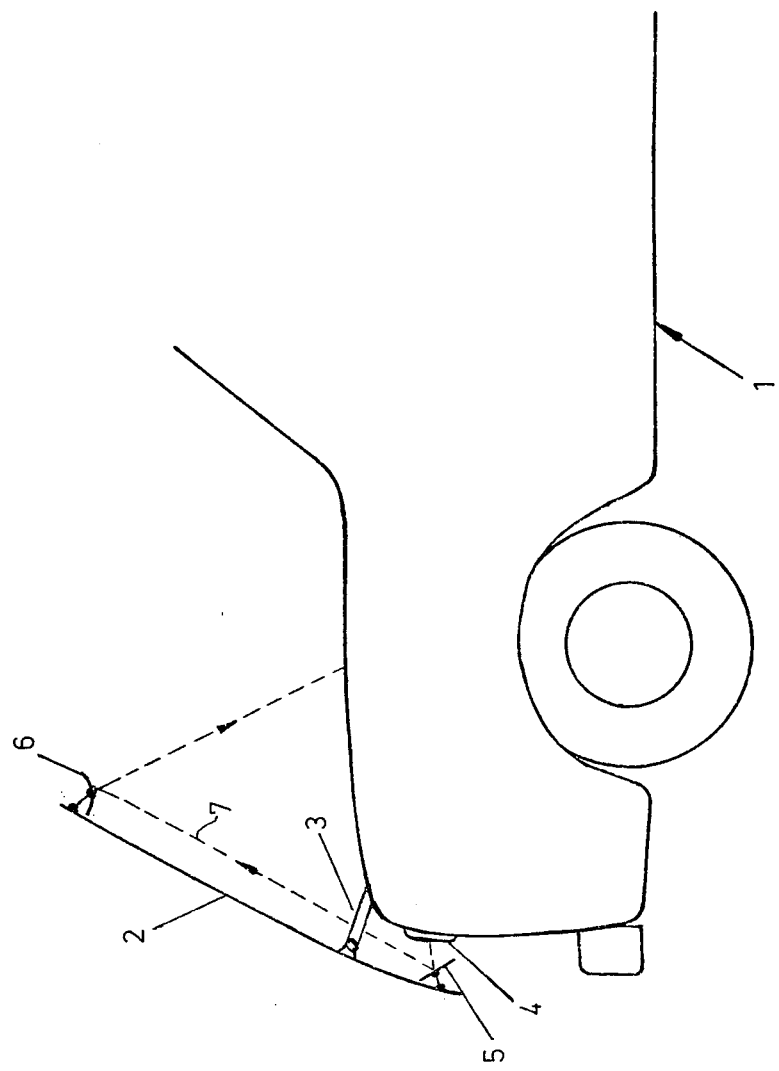

LIGHTING ARRANGEMENT FOR A BODY COMPARTMENT IN THE FRONT PORTION OF A VEHICLE

The present invention relates to a lighting arrangement for a body compartment, for example an engine compartment or a baggage compartment, located in the front portion of a vehicle having forward pointing headlights, said body compartment being closable by means of a hood opening forward in the lengthwise direction of the vehicle, said hood being arranged to have an open rest position.

Service and repair work which is to be carried out in the engine compartment of a motor vehicle often calls for good lighting in order to allow work to be performed in a satisfactory manner. This lighting can be arranged in a simple and practical manner in garages and service localities but, when repair or service measures are to be carried out at other places, for example on the roadside, it is often difficult to obtain the necessary lighting. This is especially true if some malfunction in the engine compartment is to be dealth with during the dark portion of the day. In such cases, lighting is normally lacking entirely or one only has access to a simple flashlight. This makes localizing of the malfunction difficult and thwarts the possibilities for even simple measures to be carried out.

The purpose of the present invention is to eliminate the disadvantages mentioned above and to provide a lighting arrangement which provides satisfactory illumination of body compartment in the front portion of a motor vehicle.

In a lighting arrangement according to the invention, the hood supports a first and a second mirror means, the first of which mirror means being arranged, when in position for use and when the hood is in an open rest position, to be located in the beam of light from a headlight and to be so aligned that light from the headlight is reflected, on the side of the hood facing the body compartment, to the second mirror means which is arranged, when in position for use, to reflect light coming from the first mirror means into the body compartment.

In this simple manner, light from a headlight can be directed into the body compartment, thus eliminating the need for a separate source of light such as a torch.

The invention shall be described in more detail below with reference to the enclosed drawing which shows a schematic sideview of a portion of a motor vehicle equipped with an embodiment of the arrangement according to the invention.

The forward portion of a motor vehicle 1 is equipped with an engine hood 2 which, in a closed position, forms a portion of the outer surface of the vehicle. The hood 2 can be tipped forwards during opening movements by means of it being hingedly connected to the body of the vehicle by means of two pivotable brackets 3 which are journalled in the body. The pivotable brackets are arranged to allow an upward swinging of the back end of the hood 2 to an upper open position in which position the engine compartment is exposed. The pivotable brackets 3 guide therewith the opening movement so that the forward end of the hood 2 is directed downwards in front of the front section of the vehicle 1 so as to assume a set terminal position which corresponds to the open rest position of the hood 2. The opening movement is limited by means of the construction of the pivotable brackets 3, and the hood 2 is maintained in the open rest position by means of its own weight in connection with known toggle-joint effect. In such an open position, the forward end of the hood 2 will lie in front of a pair of the vehicle's headlights 4, the latter being mounted in a conventional manner in the front section of the vehicle so as to illuminate the road in front of the vehicle when said headlights have been turned on.

Two mirrors 5, 6 are attached to the inside of the hood, preferably with attachments allowing pivoting of the mirrors. One mirror 5 is so mounted that the mirror, when the hood is in the opened position, is in a position for use in front of a headlight 4. The other mirror 6 is mounted in the upper section of the hood 2, said upper section constituting the rear end of the hood 2 when said hood is in the closed position. In use, the mirror 5 is so aligned that, when the headlights 4 are lit, the mirror 5 will reflect the light from the headlights 4 essentially parallel with the inner plane of the hood 2 to the upper mirror 6. The mirror 6 is aligned to reflect the beam of light received from the mirror 5 in a direction towards the engine compartment so as to illuminate the same. The mirror 6 can suitably be manually adjustable so that the light can be directed towards selected points in the engine compartment. The beam path is shown with broken lines 7 in the drawing.

Naturally, the invention is not restricted to the example described above. Rather, several modifications are possible within the scope of the invention. Depending on the shape of the hood, it can be desirable to make at least one of the mirrors movable between a position for use and a position for rest so that the mirror can be moved from its position for rest with the hood closed to a position for use when the hood is open. For example, the morror 5 can, when the hood does not reach as far down as in the figure, be mounted on an arm which is movable relative to the hood so that the mirror from a rest position at the interior of the hood can be moved to a position for use in front of a headlight.

In order to spread the light falling into the body compartment, the reflecting surface of the mirror 6 can be made convex. The two mirrors 5 and 6 can cooperate with one or more headlights, and they can also be removably mounted on the hood in order to be mounted only when needed. Preferably then, the hood is provided with prepared attachment points or attachment means.

The above described compartment in the vehicle body could equally well be a baggage compartment on a vehicle having a rearmounted engine.

What I claim is:

1. In an automobile having body compartments,
    at least one set of headlights,
    a hood for closing one of the body compartments having interior and exterior surfaces,
    means for attaching said hood to the automobile so as to allow said hood to be moved in a forward direction to an open position, the improvement comprising a light reflecting device for lighting said one body compartments of said automobile having
    a first mirror means for reflecting light from the headlights, said first mirror means being attached on the inerior surface of said hood and positioned adjacent the forward portion of said hood,
    a second mirror means for reflecting light from the headlights, said second mirror means being attached on the interior surface of said hood and positioned adjacent the back portion of said hood so as to be in the path of light reflected by the first mirror means, said first and said second mirror means being aligned so that the light beam from the headlights is intercepted and reflected by said first mirror means along the interior of said hood when said hood is in an open position to said second mirror means and thereafter from said second mirror means into said body compartment.

2. A light-reflecting device according to claim 1, wherein the second mirror means is pivotably mounted so that light can be directed to a selected part of the body compartment.

3. A light-reflecting device according to claim 2, wherein the reflecting surface of the second mirror means is convex so that the reflected light is spread.

4. A light-reflecting device according to claim 1 wherein the first mirror means is pivotably mounted.

* * * * *